US008537109B2

(12) United States Patent
Lye et al.

(10) Patent No.: US 8,537,109 B2
(45) Date of Patent: Sep. 17, 2013

(54) SYSTEM AND METHOD FOR AUTOMATICALLY ADJUSTING LIGHT SOURCE DRIVE CURRENT DURING OPTICAL NAVIGATION OPERATION

(75) Inventors: Andy Beng Chye Lye, Simpang Ampat (MY); Siew Chin Lee, Sungai Ara (MY); Suk Lai Yap, Gelugor (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 632 days.

(21) Appl. No.: 12/466,279

(22) Filed: May 14, 2009

(65) Prior Publication Data

US 2010/0289745 A1   Nov. 18, 2010

(51) Int. Cl.
*G06F 3/033* (2013.01)
*G09G 5/00* (2006.01)
*H04N 5/228* (2006.01)

(52) U.S. Cl.
USPC .......... 345/158; 345/156; 345/163; 345/166; 250/221

(58) Field of Classification Search
USPC ............... 345/157, 158, 156, 163, 166, 167, 345/207; 250/221; 235/455; 348/222.1
See application file for complete search history.

(56) References Cited

U.S. PATENT DOCUMENTS

| 4,197,767 | A * | 4/1980 | Leung | 477/98 |
| 7,317,447 | B2 | 1/2008 | Tan et al. | |
| 7,399,953 | B2 * | 7/2008 | Xie et al. | 250/221 |
| 2004/0160411 | A1 * | 8/2004 | Yang | 345/156 |
| 2005/0162391 | A1 * | 7/2005 | Lin | 345/163 |
| 2005/0195169 | A1 * | 9/2005 | Lin | 345/163 |
| 2006/0055666 | A1 * | 3/2006 | Chong et al. | 345/156 |
| 2006/0132443 | A1 | 6/2006 | Chien Wu | |
| 2008/0165258 | A1 * | 7/2008 | Wajs | 348/222.1 |
| 2009/0033623 | A1 * | 2/2009 | Lin | 345/158 |

* cited by examiner

*Primary Examiner* — Quan-Zhen Wang
*Assistant Examiner* — Michael J Eurice

(57) ABSTRACT

A system and method for automatically adjusting a drive current to a light source during an optical navigation operation uses brightness characteristics of captured frames of image data to determine whether each of the frames of image data belongs to one of at least first and second types of frames of image data. The drive current is adjusted depending on counts of the frames of image data belonging to the first and second types of frames of image data.

10 Claims, 5 Drawing Sheets

SYSTEM AND METHOD FOR AUTOMATICALLY ADJUSTING LIGHT SOURCE DRIVE CURRENT DURING OPTICAL NAVIGATION OPERATION

BACKGROUND OF THE INVENTION

Optical navigation systems operate to estimate movements between the optical navigation systems and target surfaces to perform tracking operations. An optical navigation system uses a light source, such as a light-emitting diode (LED) or a laser diode, to illuminate a region of a target surface and an image sensor to receive the light reflected from the target surface to successively capture frames of image data of the target surface. The optical navigation system compares the successive image frames and estimates the relative movements between the optical navigation system and the target surface based on the comparison between the current image frame and a previous image frame. The comparison is based on detecting and computing displacements of features in the captured frames of image data.

Optical navigation systems are commonly used in optical computer mice to track the movements of the mice relative to the surfaces on which the mice are manually manipulated. The movements of a computer mouse are used to control a cursor on a monitor of a computer system. An important consideration for an optical navigation system for use in an optical mouse is the intensity of the illuminating light provided by the light source of the optical navigation system. The illuminating light provided by the light source should be of sufficient intensity to illuminate different types of surfaces so that the optical navigation system can properly perform tracking operations for optical mouse movements up to a predefined rate of speed. However, the amount of illuminating light needed for different types of surfaces differs depending on the brightness of these surfaces. Brighter surfaces require less intense illuminating light than darker surfaces.

A concern with conventional optical navigation systems is that most of the conventional systems use a single drive current to drive the light source, and thus, provide an illuminating light of substantially constant intensity. However, since the illuminating light must work well for different types of surfaces, including darker surfaces, the drive current is set higher than necessary for most bright surfaces. Therefore, when operating on bright surfaces, these conventional optical navigation systems waste valuable power with respect to generation of the illuminating light.

In view of this concern, there is need for a system and method for performing optical navigation that works well for different type of surfaces while reducing power consumption.

SUMMARY OF THE INVENTION

A system and method for automatically adjusting a drive current to a light source during an optical navigation operation uses brightness characteristics of captured frames of image data to determine whether each of the frames of image data belongs to one of at least first and second types of frames of image data. The drive current is adjusted depending on counts of the frames of image data belonging to the first and second types of frames of image data.

A system for performing an optical navigation operation in accordance with an embodiment of the invention comprises a driver circuit, an image sensor, a navigation engine and an automatic drive current adjuster. The driver circuit is configured to provide a drive current to a light source to produce light on a target surface. The image sensor is configured to capture frames of image data of the target surface illuminated by the light. The navigation engine, which is operably connected to the image sensor to receive the frames of image data, is configured to generate displacement values based on comparisons of the frames of image data. The automatic drive current adjuster, which is operably connected to the image sensor to receive the frames of image data, is configured to determine whether each of the frames of image data belongs to one of at least first and second types of frames of image data with respect to brightness characteristics of the frames of image data. The automatic drive current adjuster is further configured to count the frames of image data belonging to the first and second types of frames of image data. The automatic drive current adjuster is further configured to direct the driver circuit to adjust the drive current to the light source depending on counts of the frames of image data belonging to the first and second types of frames of image data.

A method for automatically adjusting a drive current to a light source during an optical navigation operation in accordance with an embodiment of the invention comprises providing the drive current to the light source to produce light on a target surface, capturing frames of image data of the target surface illuminated by the light, generating displacement values based on comparisons of the frames of image data, determining whether each of the frames of image data belongs to at least one of first and second types of frames of image data with respect to brightness characteristics of the frames of image data, counting the frames of image data belonging to the first and second types of frames of image data, and automatically adjusting the drive current to the light source depending on counts of the frames of image data belonging to the first and second types of frames of image data.

Other aspects and advantages of the present invention will become apparent from the following detailed description, taken in conjunction with the accompanying drawings, illustrated by way of example of the principles of the invention.

DETAILED DESCRIPTION

Figure 1:
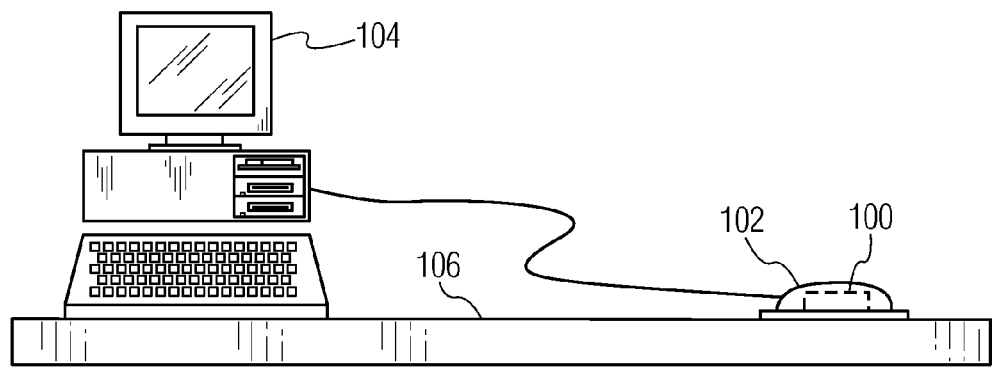
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106 by a user to control a cursor displayed on the computer 104. However, in other implementations, the optical navigation system 100 can be used in different products for various tracking applications. As described in more detail below, the optical navigation system 100 is designed to automatically adjust the light source drive current based on surfaces on which the system is being operated to reduce power consumption.

Figure 2:
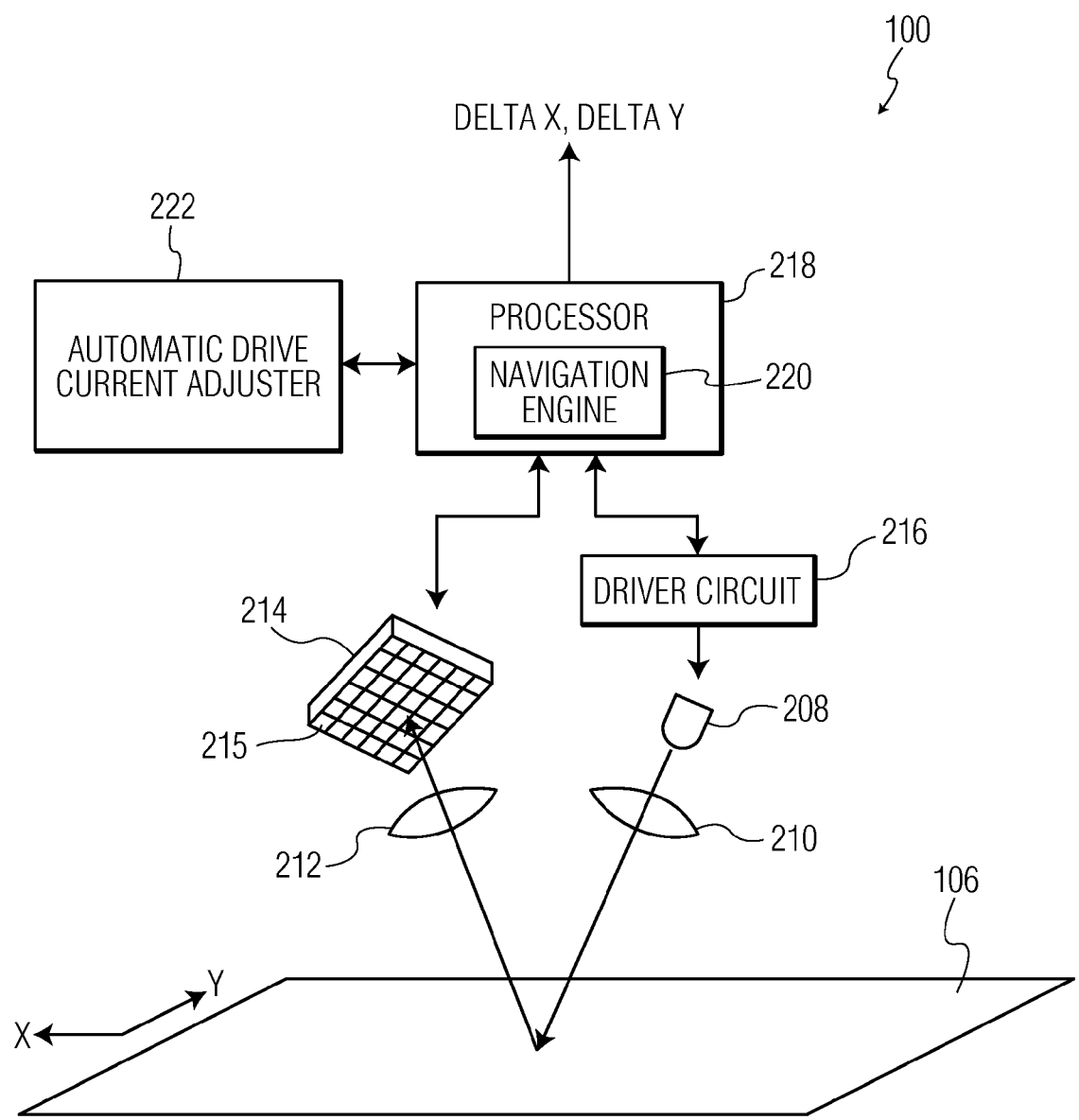
FIG. 2 is a diagram of the optical navigation system in accordance with an embodiment of the invention.

As shown in FIG. 2, the optical navigation system 100 includes a light source 208, a focusing lens 210, an imaging lens 212, an image sensor 214, a driver circuit 216, a processor 218 with a navigation engine 220, and an automatic drive current adjuster 222. Although these components of the optical navigation system 100 are shown in FIG. 2 as being separate components, some of these components may be integrated. As an example, the image sensor 214, the driver circuit 216, the processor 218 with the navigation engine 220, and the automatic drive current adjuster 222 may be integrated into a single integrated circuit chip. Furthermore, some of the components of the optical navigation system 100, such as the navigation engine 220 and the automatic drive current adjuster 222, may be implemented in any combination software, hardware and/or firmware.

The light source 208 is configured to generate light in response to an applied drive signal in the form of a drive current to illuminate a region of the target surface 106. The light source 208 can be any type of a light emitting device, such as a light-emitting diode or a laser diode. As an example, the light source 208 may be a vertical-cavity surface-emitting laser (VCSEL), which generates coherent laser beam of light. The light source 208 is activated by the driver circuit 216, which provides the drive current to the light source. The focusing lens 210 is positioned between the light source 208 and the target surface 106 to focus the light from the light source onto a region of the target surface. The imaging lens 212 is positioned between the target surface 106 and the image sensor 214 to focus the light reflected off the target surface onto the image sensor.

The image sensor 214 is configured to capture frames of image data of the target surface 106 for motion estimation. The image sensor 214 includes an array of photosensitive pixel elements 215 to capture the frames of image data of the target surface 106. Each photosensitive pixel element 215 is configured to generate an electrical signal in the form of an electrical charge when light is incident on that element. The electrical signals simultaneously generated by the photosensitive pixel elements 215 generated during an integration or exposure period represent a single captured frame of image data of the target surface 106. Successive frames of image data are captured by repeatedly exposing the photosensitive pixel elements 215 to incident light.

As an example, the image sensor 214 may be a charged-coupled device (CCD) image sensor or a complementary metal oxide semiconductor (CMOS) image sensor. The number of photosensitive pixel elements 215 included in the image sensor 214 may vary depending on at least the particular application of the optical navigation system 100. As an example, the image sensor 214 may include a 30×30 array of photosensitive pixel elements.

The processor 218 is configured to control the driver circuit 216 and the image sensor 214 in order to capture frames of image data of the target surface 106. The processor 218 is electrically connected to the driver circuit 216 and the image sensor 214 to provide control signals to these components. The processor 218 provides control signals to the driver circuit 216 to direct the driver circuit to supply the drive current to the light source 208 to activate the light source. The processor 218 provides control signals to the image sensor 214 to accumulate electrical charges at the photosensitive pixel elements 215 and integrate at least some of the photosensitive pixel elements to produce each frame of image data of the target surface 106. Thus, the processor 218 is able to control the frame rate of the optical navigation system 100.

In this embodiment, the processor 218 includes the navigation engine 220, which is programmed into the processor. In other embodiments, the navigation engine 220 may be a separate component. The navigation engine 220 operates to correlate frames of image data captured by the image sensor 214 to estimate displacement changes between the optical navigation system 100 and the target surface 106 with respect to X and Y directions. The process of correlating frames of image data for motion estimation or navigation is well known, and thus, is not described herein. The output of the navigation engine 220 includes directional delta X displacement values and directional delta Y displacement values. Each directional displacement value includes a negative or positive sign information, which indicates direction, and an absolute displacement value, which indicates the amount of displacement in that direction. In a particular implementation, the directional delta X and Y displacement values are generated in the form of hex numbers.

The automatic drive current adjuster 222 is operably connected to the image sensor 214 to receive the frames of image data captured by the image sensor. In some embodiments, the automatic drive current adjuster 222 may be connected to the processor 218, as illustrated in FIG. 2, to receive the frame of image data from the image sensor 214 via the processor. In other embodiments, the automatic drive current adjuster 222 may be connected to the image sensor 214 to receive the frames of image data.

The automatic drive current adjuster 222 is also operably connected to the driver circuit 216 to direct the driver circuit to adjust the drive current to the light source 208 when the frames of image data captured by the image sensor 214 warrants change in the intensity of the illuminating light generated by the light source. In some embodiments, the automatic drive current adjuster 222 directly controls the driver circuit 216 to adjust the light source drive current being provided by the driver circuit. In other embodiments, the automatic drive current adjuster 222 controls the driver circuit 216 to adjust the light source drive current via the processor 218. That is, the automatic drive current adjuster 222 signals to the processor 218 that the light source drive current should be adjusted and the processor controls the driver circuit 216 to adjust the light source drive current.

Figure 3:
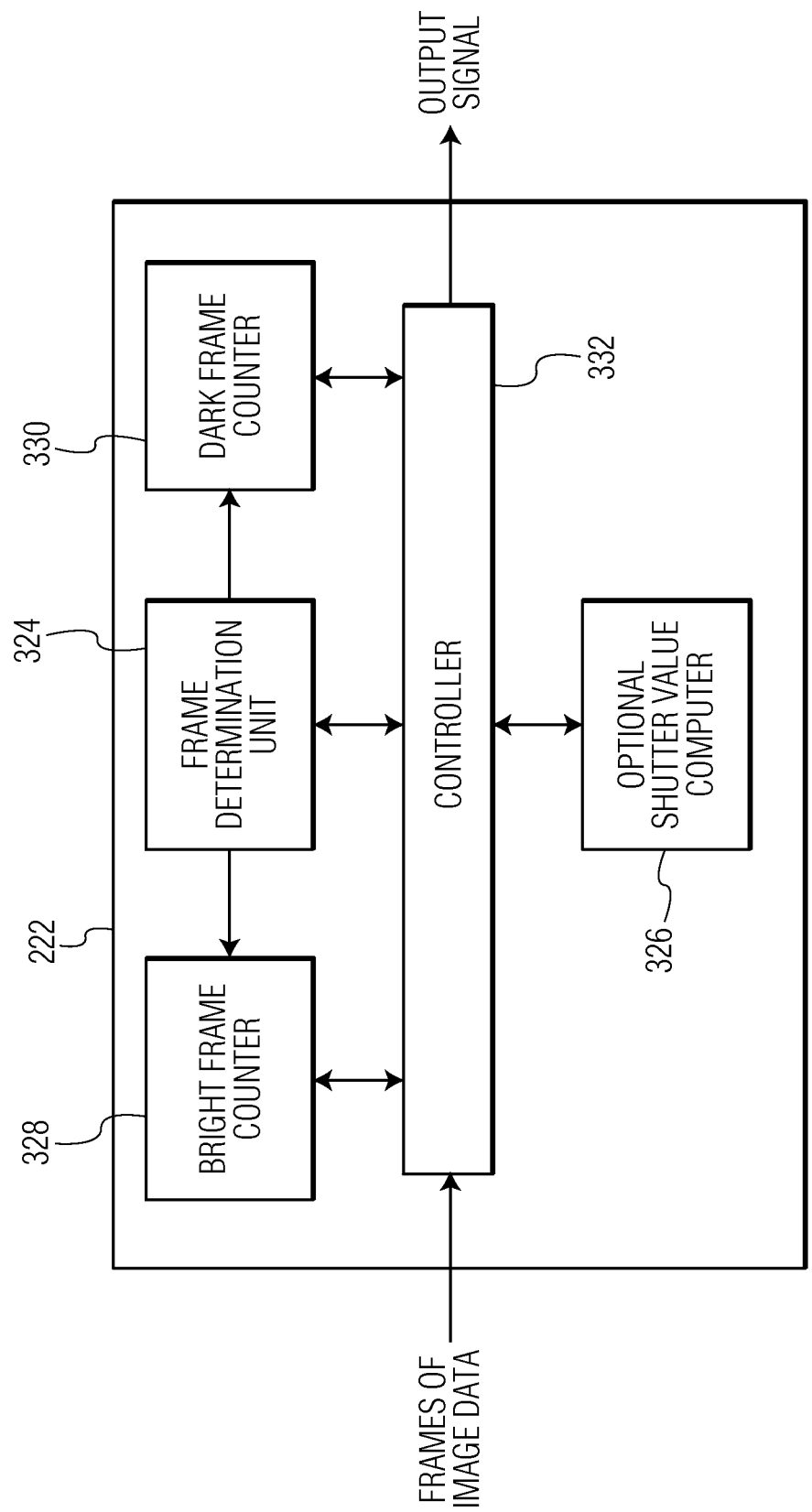
FIG. 3 is a block diagram showing components of an automatic drive current adjuster of the optical navigation system in accordance with an embodiment of the invention.

Turning now to FIG. 3, components of the automatic drive current adjuster 222 in accordance with an embodiment of the invention are shown. In this embodiment, the automatic drive current adjuster 222 operates to change the light source drive current between two predefined levels of current, e.g., 20 mA and 30 mA. However, in other embodiments, the automatic drive current adjuster 222 may change the light source drive current between more than two predefined levels of current, e.g., three or four levels of drive current. As shown in FIG. 3, the automatic drive current adjuster 222 includes a frame determination unit 324, an optional shutter value computer 326, a bright frame counter 328, a dark frame counter 330 and a controller 332. These components of the automatic current adjuster 222 may be implemented in any combination of software, hardware and/or firmware. In some embodiments, these components of the automatic current adjuster 222 may be implemented as software executed by the processor 218. Although the components of the automatic drive current adjuster 222 are shown as being separate components, some of these components may be combined in other embodiments.

The controller 332 receives frames of image data captured successively by the image sensor 214. The controller 332 first checks to see if the optical navigation system 100 has been set to force a specified drive current to the light source 208. This fixed current setting may be automatically set as a default setting or may be manually set by a user using a control, e.g., a button, on the optical computer mouse 102 or using the computer 104. If the optical navigation system 100 is set to the fixed current setting, the controller 332 outputs a control signal to direct the driver circuit 216 to change the light source drive current to the specified drive current or to maintain the specified drive current. The specified drive current is not changed until the fixed current setting is deactivated by the user or until the optical navigation system 100 is reset. If the optical navigation system 100 is not set to the fixed current setting, the frame determination unit 324 determines whether each of the frames of image data is one of two defined types of frames of image data, a first type of frames of image data ("bright frames") and a second type of image data ("dark frames"), depending on brightness characteristics of the frames of image data. In some embodiments, the frame-type determination is made by averaging pixel or brightness (intensity) values of each frame of image data and then comparing the computed average pixel value of that frame of image data to a threshold average value to classify that frame of image data as belonging to the first or second type of frames of image data. A pixel or intensity value of a frame of image data is a digital representation of the amount of electrical charge generated by one of the photosensitive pixel elements 215 of the image sensor 214 during a single exposure period. In other embodiments, the frame-type determination is made by comparing the current shutter value, which is computed using the brightness characteristics of the frame of image data being determined, to a threshold shutter value to classify that frame of image data as belonging to the first or second type of frames of image data. A shutter value is used to determine the exposure period for capturing frames of image data. The computation of shutter values using frames of image data is known, and thus, is not described herein. The current shutter value may be computed by an optional shutter value computer 326, which may be part of the automatic drive current adjuster 222, as illustrated in FIG. 3, using the frame of image data. In some embodiments, the shutter value computer 326 may be external to the automatic drive current adjuster 222. In other embodiments, the computing of the current shutter value may be performed by the processor 218.

After the type of the received frame of image data is determined, the frame determination unit 324 sends a signal to one of the counters 328 and 330 to keep track of the number of frames of image data that have been classified as the first type, i.e., the bright frames, and the number of frames of image data that have been classified as the second type, i.e., the dark frames. If the current frame of image data is determined to be a bright frame, the frame determination unit 324 sends a signal to the bright frame counter 328 so that the current count of bright frames ("the bright frame count") can be increased. In response to the signal from the frame determination unit 324, the bright frame counter 328 increases the bright frame count, for example, by one.

If the current frame of image data is determined to be a dark frame, the frame determination unit 324 sends a signal to the dark frame counter 330 so that the current count of dark frames ("the dark frame count") can be increased. Similar to the bright frame counter 328, in response to the signal from the frame determination unit 324, the dark frame counter 330 increases the dark frame current, for example, by one. In an embodiment, when the bright frame count is increased, the dark frame count is reset, for example, to zero. Similarly, when the dark frame count is increased, the bright frame count is also reset, for example, to zero. The bright and dark frame counts are also reset whenever the optical navigation system 100 is reset.

If the bright frame count reaches a bright frame threshold value, which is predefined, e.g., a value of ten, the bright frame counter 328 sends a signal to the controller 332 to inform the controller. In response, the controller 332 outputs a control signal to direct the driver circuit 216 to decrease the drive current to the light source 208 to lower the intensity of the illuminating light generated by the light source. The rationale for lowering the intensity of the illumination light in this situation is the assumption that the target surface 106 is a bright surface, and thus, does not require such bright illuminating light for the optical navigation system 100 to effectively perform optical navigation on the target surface.

Similarly, if the dark frame count reaches a dark frame threshold value, which is also predefined, e.g., a value of ten, and may or may not equal the bright frame threshold value, the dark frame counter 330 sends a signal to the controller 332 to inform the controller. In response, the controller 332 outputs a control signal to direct the driver circuit 216 to increase the drive current to the light source 208 to increase the intensity of the illuminating light generated by the light source. The rationale for increasing the intensity of the illumination light in this situation is the assumption that the target surface 106 is a dark surface, and thus, requires a brighter illuminating light for the optical navigation system 100 to effectively perform optical navigation on the target surface. If the target surface 106 has both "bright" and "dark" regions, the controller 332 may direct the driver circuit 216 to change the drive current to the light source 208 more than once during an optical navigation operation on the target surface.

In other embodiments, the controller 332 may monitor the counts in the bright and dark frame counters 328 and 330 and transmit the appropriate control signals when the count of the number of bright frames reaches the bright frame threshold value and/or when the count of the number of dark frames reaches the dark frame threshold value. Thus, in these embodiments, each of the bright and dark frame counters 328 and 330 is not configured to output a signal when its count reaches the respective threshold value. Consequently, in these embodiments, the bright and dark frame counters 328 and 330 may be simple counters.

Figure 4:
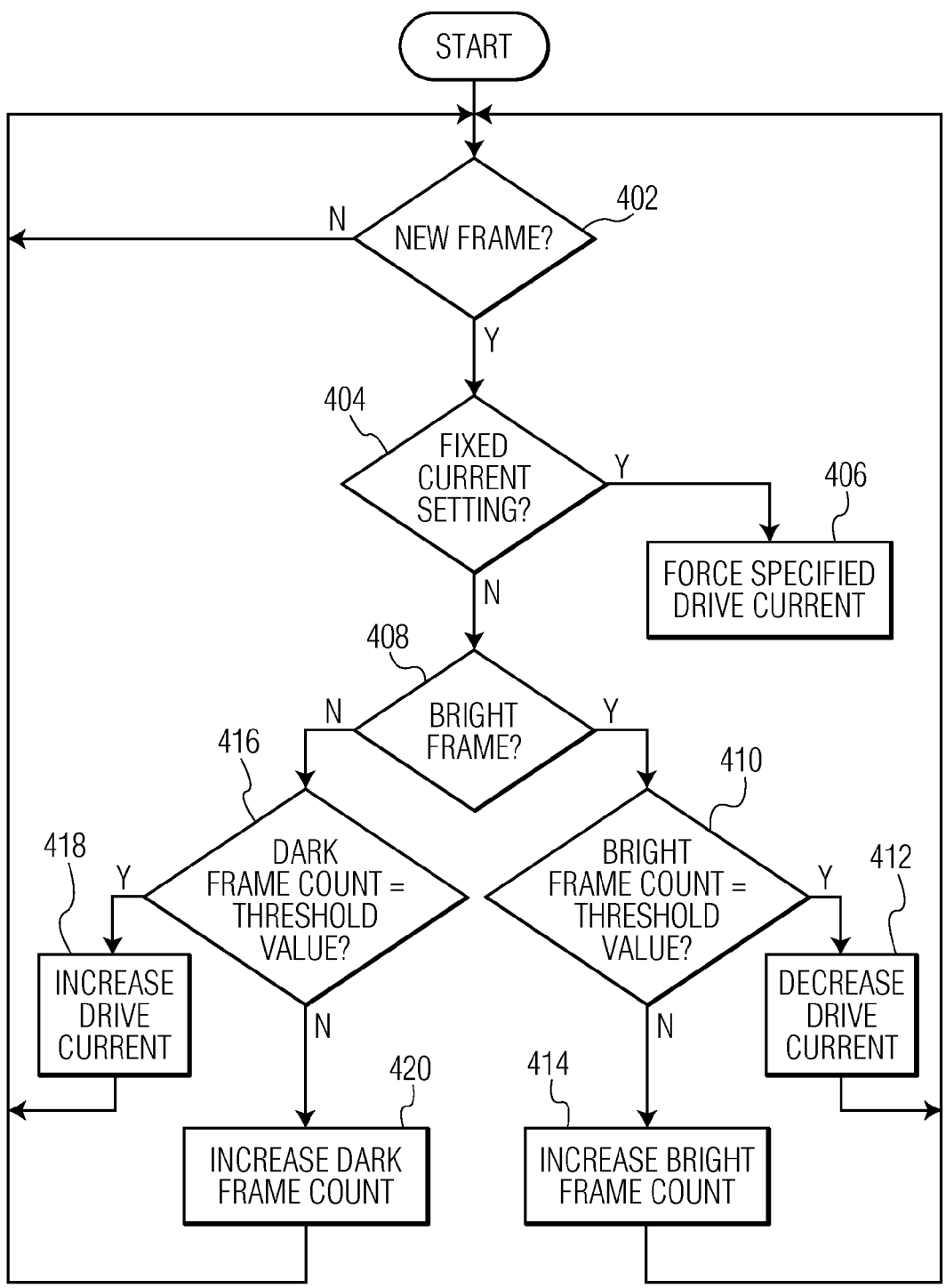
FIG. 4 is a process flow diagram of the operation of the optical navigation system in accordance with an embodiment of the invention.

The operation of the automatic current adjuster 222 in accordance with an embodiment of the invention is now described with reference to a process flow diagram of FIG. 4. At block 402, the controller 332 of the automatic current adjuster 222 checks to see if a new frame of image data has been captured by the image sensor 214. If not, this checking step is repeated until a new frame of image data has been captured. If there is a new frame of image data, the operation proceeds to block 404, where the controller 332 checks to see if the optical navigation system 100 has been set to force the specified drive current to the light source 208. If the optical navigation system 100 is set to the fixed current setting, the operation proceeds to block 406, where the controller 332 outputs a control signal to direct the driver circuit 216 to change the light source drive current to the specified drive current or to maintain the specified drive current until the fixed current setting is deactivated. If the optical navigation system 100 is not set to the fixed current setting, the operation proceeds to block 408.

At block 408, the frame determination unit 324 determines whether the current frame of image data is a "bright" frame in the manner described above. If the current frame of image data is a bright frame, the operation then proceeds to block 410. However, if the current frame of image data is not a bright frame, the current frame of image data is determined to be a "dark" frame and the operation proceeds to block 416.

At block 410, the controller 332 determines whether the current bright frame count stored in the bright frame counter 328 is equal to the bright frame threshold value. If so, then the operation proceeds to block 412, where the controller 332 outputs a signal to direct the driver circuit 216 to reduce the light source drive current, if possible, i.e., the light source drive current is currently not set to a minimum level. The operation then proceeds back to block 402. If the current bright frame count is less then the bright frame threshold value, then the operation proceeds to block 414, where the current bright frame count stored in the bright frame counter 328 is increased, for example, by one. In addition, at block 414, the current dark frame count stored in the dark frame counter 330 is reset to an initial value, e.g., zero. The operation then proceeds back to block 402.

At block 416, the controller 332 determines whether the current dark frame count stored in the dark frame counter 330 is equal to the dark frame threshold value. If so, then the operation proceeds to block 418, where the controller 332 outputs a signal to direct the driver circuit 216 to increase the light source drive current, if possible, i.e., the light source drive current is currently not set to the maximum level. The operation then proceeds back to block 402. If the current dark frame count is less then the dark frame threshold value, then the operation proceeds to block 420, where the current dark frame count stored in the dark frame counter 330 is increased, for example, by one. In addition, at block 420, the current bright frame count stored in the bright frame counter 328 is reset to an initial value, e.g., zero. The operation then proceeds back to block 402.

In this manner, the automatic drive current adjuster 222 is able to adjust the light source drive current depending on the brightness of target surfaces on which the optical navigation system 100 is being used to reduce the power consumption of the optical navigation system without compromising the tracking performance of the system. In addition, since the light source drive current is changed only when the bright or dark frame count reaches a predefined threshold value, the frequency of changes to the light source drive current is reduced.

Figure 5:
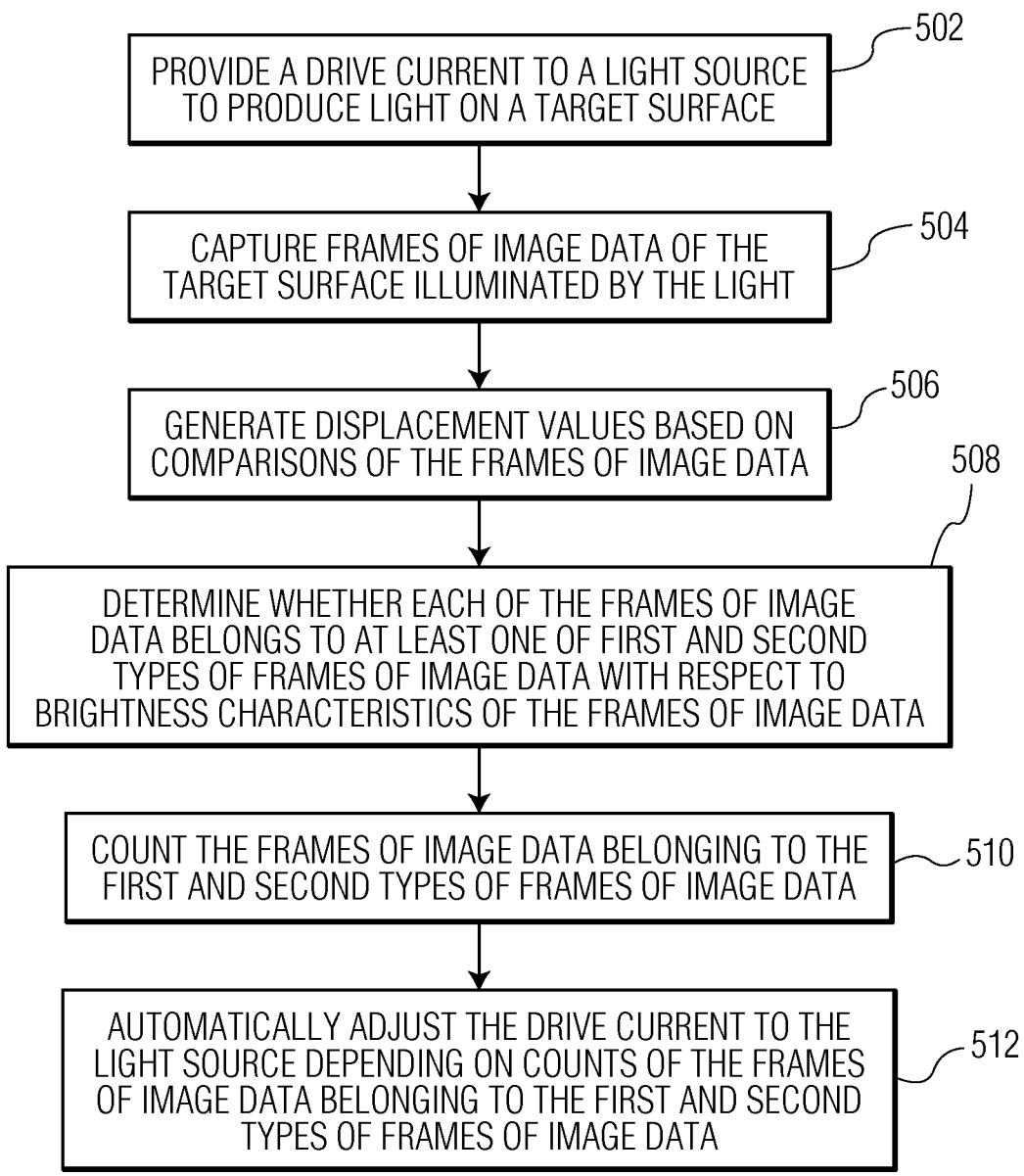
FIG. 5 is a process flow diagram of a method of automatically adjusting a drive current to a light source during an optical navigation operation in accordance with an embodiment of the invention.

A method for automatically adjusting a drive current to a light source during an optical navigation operation in accordance with an embodiment of the invention is described with reference to a process flow diagram of FIG. 5. At block 502, the drive current is provided to the light source to produce light on a target surface. At block 504, frames of image data of the target surface illuminated by the light are captured. At block 506, displacement values are generated based on comparisons of the frames of image data. At block 508, a determination is made whether each of the frames of image data belongs to at least one of first and second types of frames of image data with respect to brightness characteristics of the frames of image data. At block 510, the frames of image data belonging to the first and second types of frames of image data are counted. At block 512, the drive current to the light source is automatically adjusted depending on counts of the frames of image data belonging to the first and second types of frames of image data.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for performing an optical navigation operation to track relative movements of a computer input device, the system comprising:
   a driver circuit configured to provide a drive current to a light source to produce light on a target surface;
   an image sensor configured to capture frames of image data of the target surface illuminated by the light;
   a navigation engine operably connected to the image sensor to receive the frames of image data, the navigation engine being configured to generate displacement values based on comparisons of the frames of image data; and
   an automatic drive current adjuster operably connected to the image sensor to receive the frames of image data, the automatic drive current adjuster comprising a frame determination unit configured to determine whether each of the frames of image data belongs to one of at least first and second types of frames of image data with respect to brightness characteristics of the frames of image data, the automatic drive current adjuster further comprising a first counter to count the frames of image data belonging to the first type of frames of image data and a second counter to count the frames of image data belonging to the second type of frames of image data, the automatic drive current adjuster being configured to direct the driver circuit to adjust the drive current to the light source depending on counts of the frames of image data belonging to the first and second types of frames of image data,
   wherein the automatic drive current adjuster is configured to direct the driver circuit to reduce the drive current to the light source when the count of the frames of image data belonging to the first type of frames of image data reaches a first predefined value and wherein the automatic drive current adjuster is configured to direct the driver circuit to increase the drive current to the light source when the count of the frames of image data belonging to the second type of frames of image data reaches a second predefined value, and
   wherein the automatic drive current adjuster is configured to reset at least one of the count of the frames of image data belonging to the first type of frames of image data and the count of the frames of image data belonging to the second type of frames of image data when at least one of the two counts is changed, wherein the automatic drive current adjuster is configured to increase the count of the frames of image data belonging to the first type of frames of image data when a frame of image data has been determined to belong to the first type of frames of image data and when the count of the frames of image data belonging to the first type of frames of image data is less than the first predefined value and wherein the automatic drive current adjuster is configured to reset the count of the frames of image data belonging to the second type of frames of image data when the count of the frames of image data belonging to the first type of frames of image data is increased.

2. The system of claim 1 wherein the automatic drive current adjuster is configured to compare a current shutter value to a threshold shutter value to determine whether each of the frames of image data belongs to one of at least the first and second types of frames of image data.

3. The system of claim 1 wherein the automatic drive current adjuster is configured to compare an average pixel value of each of the frames of image data to a threshold average value to determine whether each of the frames of image data belongs to one of at least the first and second types of frames of image data.

4. The system of claim 1 wherein the automatic drive current adjuster is configured to increase the count of the frames of image data belonging to the second type of frames of image data when a frame of image data has been determined to belong to the second type of frames of image data and when the count of the frames of image data belonging to the second type of frames of image data is less than the second predefined value.

5. The system of claim 4 wherein the automatic drive current adjuster is configured to reset the count of the frames of image data belonging to the first type of frames of image data when the count of the frames of image data belonging to the second type of frames of image data is increased.

6. A method for automatically adjusting a drive current to a light source during an optical navigation operation to track relative movements of a computer input device, the method comprising:
   providing the drive current to the light source to produce light on a target surface;
   capturing frames of image data of the target surface illuminated by the light;
   generating displacement values based on comparisons of the frames of image data;
   determining whether each of the frames of image data belongs to at least one of first and second types of frames of image data with respect to brightness characteristics of the frames of image data;
   counting the frames of image data belonging to the first and second types of frames of image data to derive a first count of the frames of image data belonging to the first type of frames image data and a second count of the frames of image data belonging to the second type of frames of image data;
   automatically adjusting the drive current to the light source depending on the first and second counts of the frames of image data belonging to the first and second types of frames of image data; and
   resetting at least one of the first and second counts of the frames of image data when at least one of the first and second counts of the frames of image data is changed,
   wherein the automatically adjusting includes decreasing the drive current to the light source when the first count of the frames of image data belonging to the first type of frames of image data reaches a first predefined value and wherein the automatically adjusting includes increasing the drive current to the light source when the second count of the frames of image data belonging to the second type of frames of image data reaches a second predefined value,
   wherein the counting includes increasing the first count of the frames of image data belonging to the first type of frames of image data when a frame of image data has been determined to belong to the first type of frames of image data and when the first count of the frames of image data belonging to the first type of frames of image data is less than the first predefined value and the method further comprises resetting the second count of the frames of image data belonging to the second type of frames of image data when the first count of the frames of image data belonging to the first type of frames of image data is increased.

7. The method of claim 6 wherein the determining includes comparing a current shutter value to a threshold shutter value to determine whether each of the frames of image data belongs to one of at least the first and second types of frames of image data.

8. The method of claim 6 wherein the determining includes comparing an average pixel value of each of the frames of image data to a threshold average value to determine whether each of the frames of image data belongs to one of at least the first and second types of frames of image data.

9. The method of claim 6 wherein the counting includes increasing the second count of the frames of image data belonging to the second type of frames of image data when a frame of image data has been determined to belong to the second type of frames of image data and when the second count of the frames of image data belonging to the second type of frames of image data is less than the second predefined value.

10. The method of claim 9 further comprising resetting the first count of the frames of image data belonging to the first type of frames of image data when the second count of the frames of image data belonging to the second type of frames of image data is increased.

\* \* \* \* \*